United States Patent [19]

Seragnoli et al.

[11] Patent Number: 4,688,442
[45] Date of Patent: Aug. 25, 1987

[54] DEVICE FOR CONVERTING THE CONTINUOUS ROTARY MOTION OF A DRIVE SHAFT INTO THE INTERMITTENT ROTARY MOTION OF A DRIVEN SHAFT

[75] Inventors: Enzo Seragnoli; Antonio Gamberini, both of Bologna, Italy

[73] Assignee: G.D. Societa per Azioni, Bologna, Italy

[21] Appl. No.: 870,668

[22] Filed: Jun. 2, 1986

Related U.S. Application Data

[63] Continuation of Ser. No. 486,043, Apr. 18, 1983, abandoned.

[30] Foreign Application Priority Data

May 13, 1982 [IT] Italy .................. 3422 A/82

[51] Int. Cl.4 .......................... F16H 27/04; F16H 1/16
[52] U.S. Cl. ...................... 74/426; 74/84 R
[58] Field of Search ................. 74/84 R, 426, 569

[56] References Cited

U.S. PATENT DOCUMENTS

| | | | |
|---|---|---|---|
| 215,810 | 5/1879 | Eaton | 74/426 |
| 581,818 | 5/1897 | Goddu | 74/426 |
| 1,575,909 | 3/1926 | Giselson | 74/426 |
| 1,847,312 | 3/1932 | Seufert | 74/569 |
| 2,999,311 | 9/1961 | McDonald et al. | 74/426 |
| 3,007,345 | 11/1961 | Hider | 74/426 |
| 4,448,093 | 5/1984 | Moller | 74/426 |

FOREIGN PATENT DOCUMENTS

| | | | |
|---|---|---|---|
| 93221 | 1/1923 | Austria | 74/426 |
| 575966 | 5/1924 | France | 74/426 |
| 973472 | 2/1951 | France | 74/426 |

Primary Examiner—Allan D. Herrmann
Attorney, Agent, or Firm—Cushman, Darby & Cushman

[57] ABSTRACT

A device converts the continuous rotary motion of a drive shaft into the intermittent rotary motion of a driven shaft, in particular with intermittent rotations of an amplitude of 180°. The device comprises a plate keyed to the driven shaft, one side of which is provided with a plurality of movement elements spread over a given circumference, and a drum whose axis is perpendicular to the axis of the plate, keyed to the drive shaft and provided peripherally with a plurality of tracks.

The tracks engage the movement elements, during the rotation of the drum, alternately, in pairs, on the opposite sides of one and the same movement element and, individually, on subsequent pairs of movement elements.

1 Claim, 7 Drawing Figures

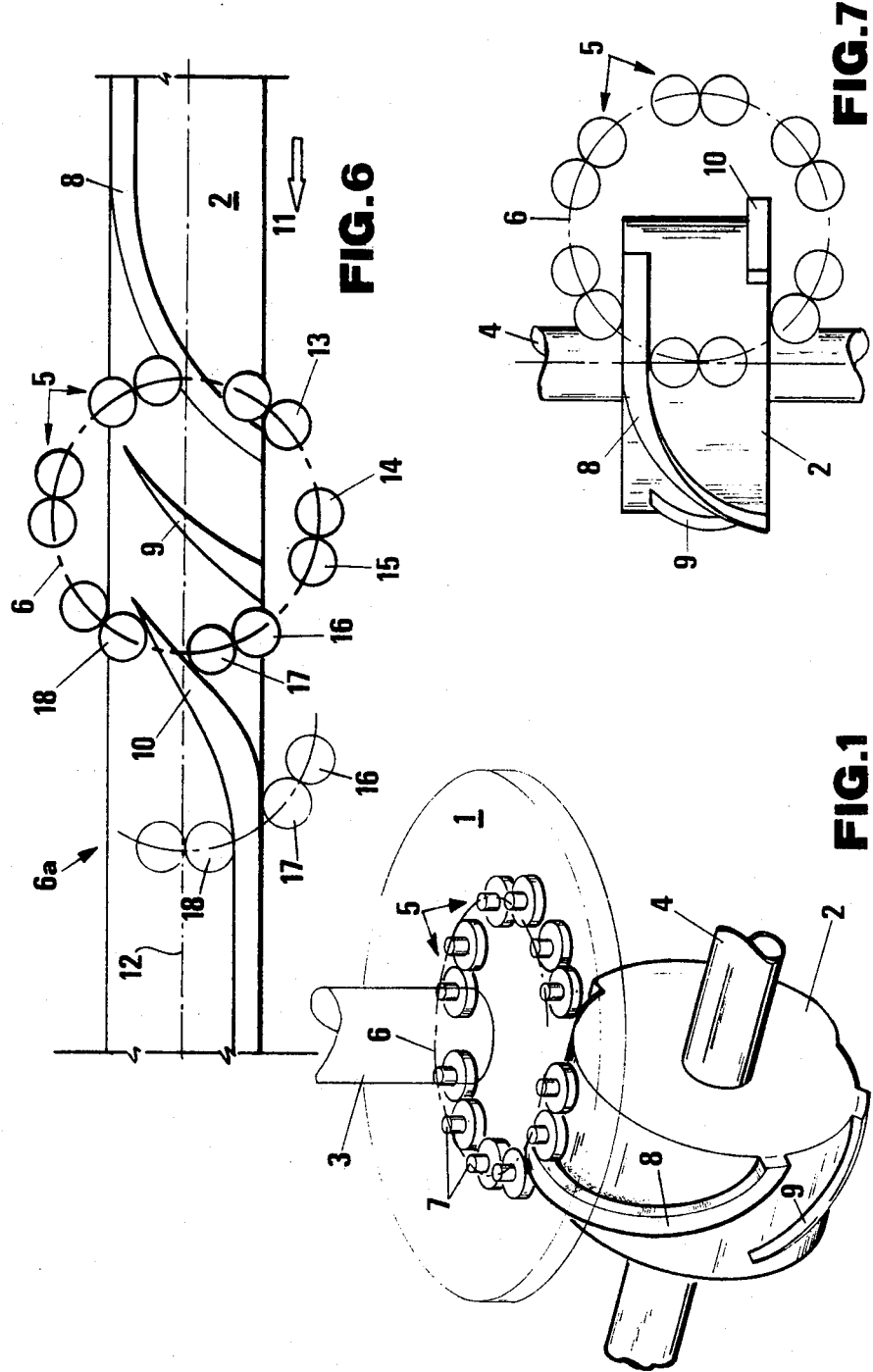

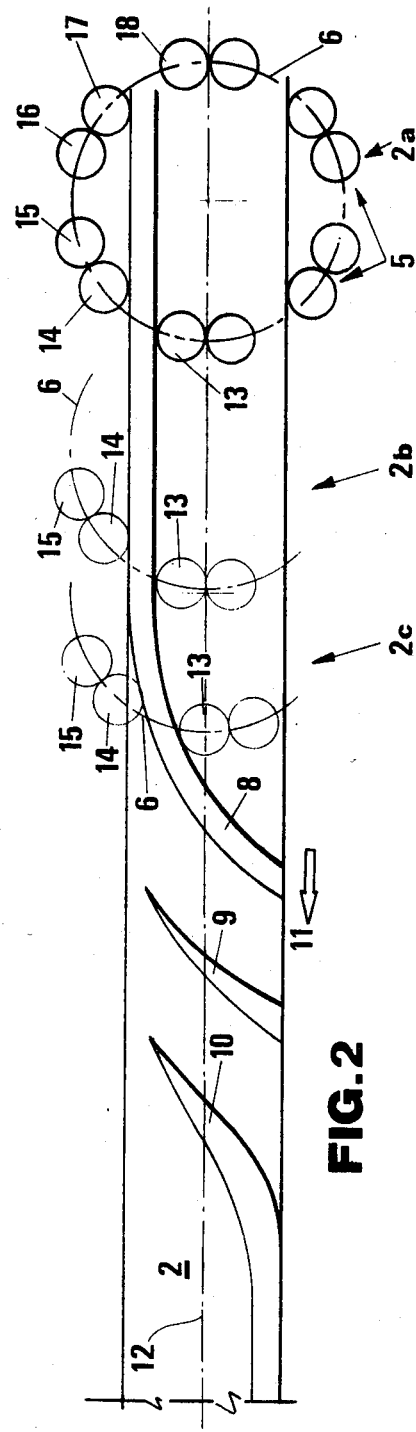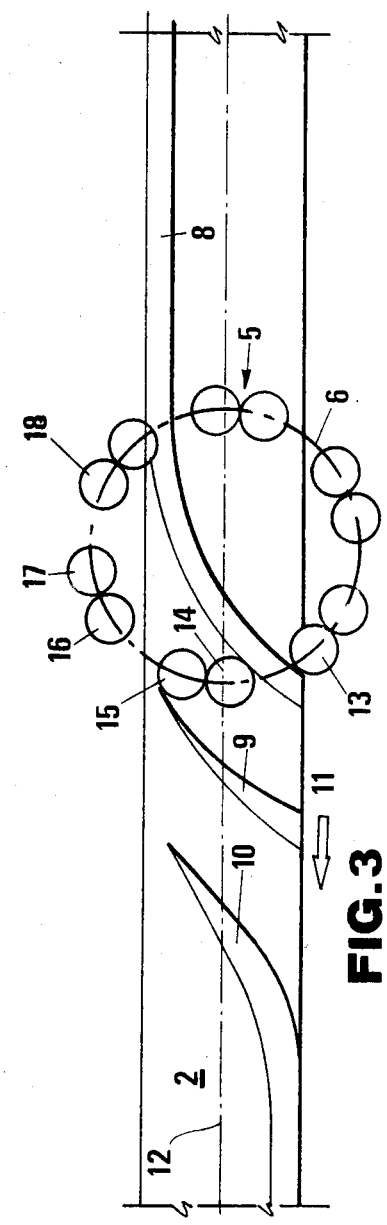

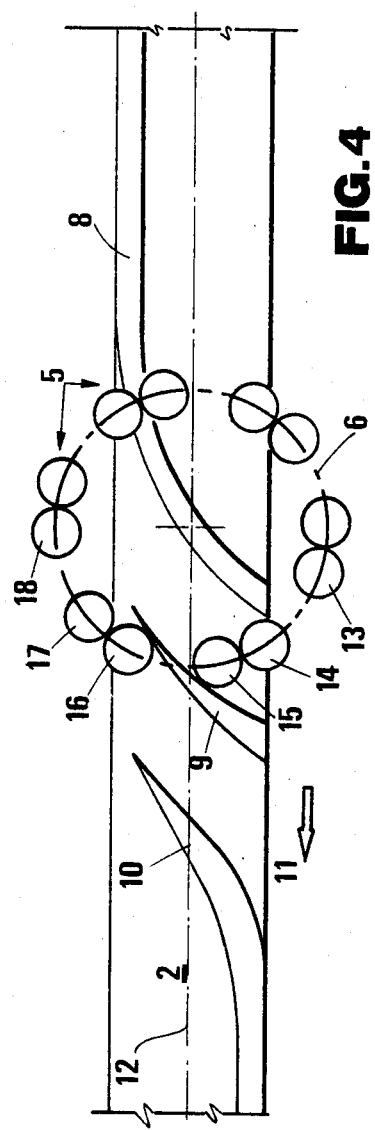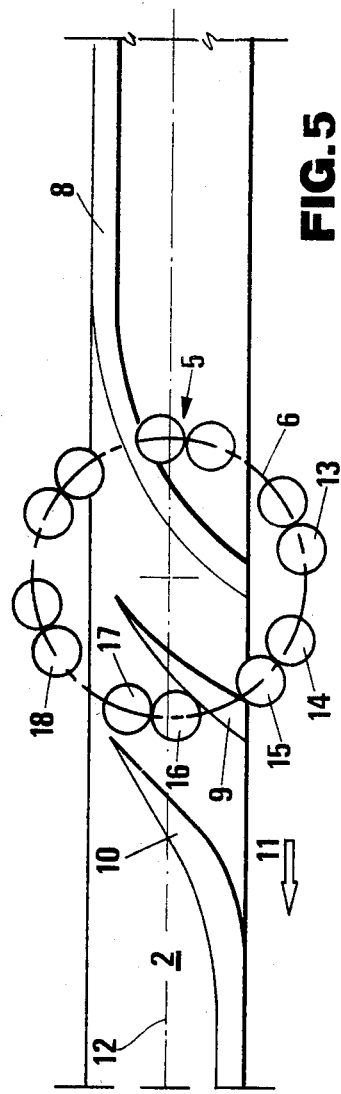

15 # DEVICE FOR CONVERTING THE CONTINUOUS ROTARY MOTION OF A DRIVE SHAFT INTO THE INTERMITTENT ROTARY MOTION OF A DRIVEN SHAFT

This is a continuation of application Ser. No. 486,043, filed Apr. 18, 1983, which was abandoned upon the filing hereof.

FIELD OF THE INVENTION

The invention relates to a device for converting the continuous rotary motion of a drive shaft into the intermittent rotary motion of a driven shaft.

DESCRIPTION OF THE RELATED ART

As is known, in the field of automatic machines the need very frequently exists to provide elements such as wrapping or transfer wheels with intermittent rotary motion around their own axes.

Intermittent rotation of this nature is generally achieved through Geneva wheel mechanisms or through means constituted by a plate provided with a number of projecting rollers which enter and fit inside a groove machined in the surface of a cylindrical drum, the axis of which is perpendicular to the axis of the plate.

With the first of the solutions there is, however, the problem of not being able, with each revolution of the drive shaft, to transmit a rotation of a considerable angular amplitude (for example 180°) to the driven shaft, without resorting to multiplication gear trains. Unadvisable is, instead, the second solution because the drum to which the motive action is applied needs to be very generously dimensioned, length and diameter wise, in order to pass rotation steps of a considerable angular amplitude onto the driven element.

SUMMARY OF THE INVENTION

The object of the invention is, therefore, to construct a device that enables the continuous rotation of a drive shaft to be converted into the intermittent rotation, in steps of a considerable angular amplitude, of a driven shaft, and to do so in a simple and functional fashion, with the element to which the motive action is applied being of a limited volume.

This and other objects too are all attained by the invention which relates to a device for converting the continuous rotary motion of a drive shaft into the intermittent rotary motion of a driven shaft, comprising a plate or follower keyed to the driven shaft and provided on one side with a plurality of movement elements spread uniformly over a circumference, and a drum or element to which the motive action is applied keyed to the drive shaft, facing the side of the plate, the axis of the drum being perpendicular to the axis of the plate; the drum being provided with a plurality of tracks, machined along the periphery thereof, for engaging the movement elements; it being possible for the tracks to be engaged in succession, individually or in pairs, as the drum rotates, by two of the movement elements in succession or by one single movement element, respectively.

BRIEF DESCRIPTION OF THE DRAWINGS

Further characteristics and advantages of the invention will become more apparent from the description that follows of one preferred embodiment, illustrated purely as an example on the accompanying drawings, in which:

FIG. 1 shows, in a diagrammatic perspective view, the device forming the subject of the invention;

FIGS. 2 to 6 show, in diagrammatic views, the device in question of four different stages of operation;

FIG. 7 shows, in a diagrammatic plan view, the device depicted in FIG. 1.

DESCRIPTION OF THE PREFERRED EMBODIMENT

With reference to FIG. 1, there is shown a circular plate 1 and a right cylindrical drum 2, repsectively, the former keyed to a shaft 3 and the latter to a shaft 4, one perpendicular to the other. The shaft 3 extends vertically and on the plate 1 there is mounted a plurality of movement elements 5, each of which is constituted by a pair of flat-plate rollers placed along a circumference 6 of a circle with a center that runs coincidentally through the center of the axis of the shaft 3. The rollers are loosely mounted on axes 7 perpendicular to the plane of the plate 1, each of the pairs being placed with one roller at the side of the other without one pair touching the other pair. In the example illustrated, the plate 1 is provided with six movement elements 5, i.e. six pairs of rollers, angularly equidistant one with respect to the other.

The cylindrical drum is placed circumferentially alongside the surface of the plate 1 that carries the aforementioned rollers, with the axis of the drum 2 situated beneth the circumference 6 and tangential thereto when the plate 1 and drum 2 are seen in a plan view (FIG. 7).

The drum 2 is provided with a number of peripheral tracks, constituted by ridges with rectangular cross-sections that extend curvilinearly. In the case described herein by way of an example, three tracks 8, 9 and 10 have been provided in order to produce, in combination with the six roller pair or movement elements 5, a rotation through 180° of the plate 1 with each full revolution of the drum 2 (see FIG. 2).

The operation of the device in question will now be examined with reference to FIGS. 2 to 6 and bearing in mind that, in order to simplify the description, the drum 2 is assumed to expand in a plane (as shown in the figures), and to cause the plate 1 to advance with rotary motion around its axis in a linear direction shown by an arrow 11, along an axis 12 of the depicted expansible path of the drum 2.

According to what is shown in FIG. 2, there have been depicted, from right to left, three different positions, namely 2a, 2b and 2c, occupied in succession by the plate 1. In the first position 2a, the plate 1 is placed with two rollers 13 and 14, belonging to two contiguous pairs or movement elements 5, in secure contact with the two opposite sides of the track 8.

In the first stage 2a of rotation of the drum 2, the part of the track 8 in secure contact with the rollers 13 and 14 is parallel to the axis 12 in such a way that the plate 1 does not rotate around its own peripindicular axis through the shaft 3. This situation continues until the rollers 13 and 14, position 2b having been reached by the plate 1, arrive in contact with the curved part of the track 8 which initiates a counterclockwise rotation of the plate 1.

The plate 1 is then carried into the configuration shown in FIG. 3, in which the roller 13 is about to move away from the track 8, while a roller 15 of the element that includes the roller 14 starts engaging without slippage the side of the track 9 turned towards the track 8.

In a similar way, according to what is shown in FIG. 4, the parting of the roller 14 from the track 8 is preceded by the secure engagement with the track 9 of a roller 16 belonging to the pair or movement element 5 next, with reference to the rotation direction of the plate 1, to that pair comprising the rollers 14 and 15.

Subsequently, in FIG. 5, a roller 17 adjacent to the roller 16 engages securely the side of the track 10 that faces the track 9, after which, prior to the roller 16 leaving the track 9, a roller 18 of the movement element 5 that follows the one pair constituted by the rollers 16 and 17, comes into secure contact with one side of the track 10 (FIG. 6).

The track 10 terminates in a straight end section similar and parallel to the initial section of the track 8, and once this has been reached on the part of the two rollers belonging to the consecutive pairs (see FIG. 6 for the position 6a of the plate 1), the rotation of the plate 1 which, in the example described, completes a rotation around its own axis through 180° during the full rotation of the drum 2, is at an end.

When suitably dimensioning the drum 2 and, therefore, the length of the straight sections of the tracks 8 and 10, it is possible to define in accordance with the requirements, the pause time of the plate 1 in between one rotation step and another.

From what has been said, it can clearly be seen how it is possible, by means of the device in question, to convert the continuous rotary motion of an element to which motive action is applied (the drum 2) into intermittent rotary motion, even in steps of a high angular amplitude, of a follower element (the plate 1), utilizing a drum of reduced dimensions both axially and radially. The reduction in volume, which does not present any particular problem as regards slippage of the plate 1, has been rendered possible for the drum 2 by the presence thereon of a number of tracks, side by side, designed to serve, individually or in pairs, as elements with which pairs of rollers belonging to successive movement elements 5 (FIGS. 2, 5 and 6), or the two rollers of one and the same movement element 5 (FIGS. 3 and 5), respectively, engage. Furthermore, the continuous gripping condition between the tracks and the rollers is able to maintain the plate 1 guided constantly at any moment, both during the motion stages of the plate 1 and during the pauses thereof.

The described utilization, for each movement element 5, of two rollers placed side by side but not in contact with adjacent pairs of rollers, is preferred since, in the operating stages when engaging the different tracks concerned (FIGS. 3 and 5), the rollers are carried in rotation around their axes 7 in opposite directions without one roller interfering with the other and without their rubbing against the tracks.

Naturally the described utilization of loosely mounted rollers is the most functional solution to ease the sliding movement between the rollers and the tracks, although it would be possible to employ movement elements 5 constituted by individual rollers, pins or slides.

To conclude, it should be noted that the number of the described tracks is a function of the number of movement elements 5 provided on the plate 1 and of the angle of rotation it is wished that the latter undergoes per step, and thus if, for example, the plate 1 has only four movement elements 5, just two tracks on the drum 2 suffice for the plate 1 to effect a turn of 180°. In this case, however, the axial dimensions of the drum 2 inevitably are less restricted than are those pertinent to the embodiment described herein.

In the practical form of the preferred embodiment, the described device can naturally also adopt forms that differ from the form described above without in any way deviating from the framework of claim protection afforded to the invention.

What is claimed is:

1. A device for converting continuous rotary motion to intermittent rotary motion, comprising:

a first shaft means for providing continuous rotary motion;

a second shaft means for providing intermittent rotary motion, said second shaft means being disposed perpendicular to said first shaft means;

a plate being mounted on one end of the second shaft means and having an outer circumference;

a plurality of pairs of flat-plate idle rollers fixed to and arranged at a distance uniformly inward from the outer circumference of the plate, each of said pairs of idle rollers being spaced out of contact from adjacent pairs of idle rollers, each idle roller in each of the pairs of idle rollers being in contact with an idle roller with which said idle roller is paired;

a right cylindrical drum being mounted on the first shaft means and having a periphery;

a plurality of cam tracks being disposed one after the other on the periphery of the right cylindrical drum;

whereby each of the pairs of flat-plate idle rollers travels in successive between adjacent cam tracks with secure engagement during rotation of the first shaft means to avoid both forward and rearward movement of the second shaft means relative to the first shaft means so that the second shaft means rotates 180° with each 360° rotation of the first shaft means.

* * * * *